United States Patent
Peng et al.

(10) Patent No.: US 11,912,598 B2
(45) Date of Patent: Feb. 27, 2024

(54) DEVICES FOR KITCHEN WASTE DIGESTION

(71) Applicant: CHANGZHOU UNIVERSITY, Jiangsu (CN)

(72) Inventors: Mingguo Peng, Changzhou (CN); Jianfeng Ma, Changzhou (CN); Yang Qu, Changzhou (CN); Linqiang Mao, Changzhou (CN); Erdeng Du, Changzhou (CN); Fang Zhu, Changzhou (CN); Weibing Zhu, Changzhou (CN); Dongxiao Shi, Changzhou (CN); Qiuya Zhang, Changzhou (CN); Yanqiu Zhang, Changzhou (CN); Lu Zheng, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/455,598

(22) Filed: Aug. 24, 2023

(65) Prior Publication Data
US 2024/0034656 A1    Feb. 1, 2024

Related U.S. Application Data

(63) Continuation-in-part of application No. PCT/CN2022/111309, filed on Aug. 10, 2022.

(30) Foreign Application Priority Data

Jul. 28, 2022    (CN) .......................... 202210896946.5

(51) Int. Cl.
*C02F 3/00*    (2023.01)
*C02F 1/46*    (2023.01)
(Continued)

(52) U.S. Cl.
CPC .......... *C02F 3/005* (2013.01); *C02F 1/46109* (2013.01); *C02F 1/4674* (2013.01);
(Continued)

(58) Field of Classification Search
CPC .... C02F 3/005; C02F 1/46109; C02F 1/4674; C02F 3/28; C02F 11/006; C02F 11/04;
(Continued)

(56) References Cited

FOREIGN PATENT DOCUMENTS

| CN | 102674544 A | 9/2012 |
|---|---|---|
| CN | 103773807 A | 5/2014 |

(Continued)

OTHER PUBLICATIONS

Machine-generated English translation of CN 211914954, generated on Oct. 16, 2020.*

(Continued)

*Primary Examiner* — Fred Prince
(74) *Attorney, Agent, or Firm* — METIS IP LLC

(57) ABSTRACT

Embodiments of the present disclosure provide a device for kitchen waste digestion, including: a first treatment container, provided with a feed pipe and an exhaust pipe at a top, and internally configured with a plurality of pole plate pairs, the pole plate pairs including two pole plates, one of the pole plates being connected to a positive pole of a power source and another being connected to a negative pole of the power source, and a plurality of sieve holes being provided in each of the pole plates; and a second treatment container, a top of the second treatment container connecting to a bottom of the first treatment container, a middle part being configured with a plurality of filler layers spaced apart in a vertical direction, and a bottom being configured with an iron-carbon filler; and a filler in the filler layers including calcium peroxide and magnetite particles.

10 Claims, 3 Drawing Sheets

(51) Int. Cl.
  *C02F 1/461* (2023.01)
  *C02F 1/467* (2023.01)
  *C02F 3/28* (2023.01)
  *C02F 11/00* (2006.01)
  *C02F 11/04* (2006.01)
  *C02F 103/32* (2006.01)

(52) U.S. Cl.
  CPC .............. *C02F 3/28* (2013.01); *C02F 11/006* (2013.01); *C02F 11/04* (2013.01); *C02F 2001/46157* (2013.01); *C02F 2103/32* (2013.01); *C02F 2305/06* (2013.01)

(58) Field of Classification Search
  CPC ........ C02F 2001/46157; C02F 2103/32; C02F 2305/06
  USPC ............... 210/603, 612, 614, 615, 616, 617, 210/748.01, 85, 95, 252, 259, 260
  See application file for complete search history.

(56) References Cited

FOREIGN PATENT DOCUMENTS

| | | | |
|---|---|---|---|
| CN | 103787468 | A | 5/2014 |
| CN | 103923821 | A | 7/2014 |
| CN | 104031949 | A | 9/2014 |
| CN | 106673140 | A | 5/2017 |
| CN | 107298490 | A | 10/2017 |
| CN | 110079444 | A * | 8/2019 |
| CN | 209651976 | U | 11/2019 |
| CN | 111392863 | A | 7/2020 |
| CN | 111559801 | A | 8/2020 |
| CN | 111592195 | A | 8/2020 |
| CN | 111690530 | A | 9/2020 |
| CN | 211914954 | U * | 11/2020 |
| CN | 113603218 | A | 11/2021 |
| CN | 113695356 | A | 11/2021 |
| JP | H08155426 | A | 6/1996 |
| JP | 2005205372 | A | 8/2005 |

OTHER PUBLICATIONS

Machine-generated English translation of CN 110079444, generated on Oct. 16, 2020.*

International Search Report in PCT/CN2022/111309 dated Nov. 28, 2022, 8 pages.

Written Opinion in PCT/CN2022/111309 dated Nov. 26, 2022, 7 pages.

* cited by examiner

DEVICES FOR KITCHEN WASTE DIGESTION

CROSS-REFERENCE TO RELATED APPLICATIONS

This application is a Continuation-in-part of International Application No. PCT/CN2022/111309 filed on Aug. 10, 2022, which claims priority to Chinese Patent Application No. 202210896946.5 filed on Jul. 28, 2022, the entire contents of each of which are hereby incorporated by reference.

TECHNICAL FIELD

The present disclosure relates to the field of kitchen waste treatment, and in particular to a device for kitchen waste digestion.

BACKGROUND

Kitchen waste, commonly known as swill feet, is a domestic waste formed by residents in the process of living and consuming, which is extremely easy to rot and deteriorate, emit a foul odor, and spread bacteria and viruses. At present, a general treatment process for kitchen waste is as follows: after unified recycling into a treatment production line, the kitchen waste being sorted and magnetically selected to sieve out inorganic materials such as chopsticks, plastic bags, and metals. After crushing, oil-water separation, and dehydration, solids of the remaining kitchen waste are sent to aerobic fermentation equipment, while liquids undergo an anaerobic treatment process. Salts in the kitchen waste go entirely into the liquids. Excessive salt is detrimental to biofermentation, so salinity needs to be reduced first before kitchen waste is digested. During normal digestion, fermentation bacteria convert organic matter in a substrate to methane and carbon dioxide through processes of hydrolysis, acidification, hydrogen and acetate acidification, and methanogenesis. The balance between fermentation and methanogenesis, as well as the interactions between microorganisms, may affect the conversion efficiency of conversion of organic matter to methane.

Therefore, it is desired to provide a device for kitchen waste digestion to improve the conversion efficiency of the conversion of organic matter to methane.

SUMMARY

One or more embodiments of the present disclosure provide a device for kitchen waste digestion. The device includes a first treatment container and a second treatment container. The first treatment container is provided with a feed pipe and an exhaust pipe at a top and internally configured with a plurality of pole plate pairs spaced apart from top to bottom. The pole plate pairs include two pole plates spaced apart from top to bottom, one of the pole plates in the pole plate pairs being connected to a positive pole of a power source and another being connected to a negative pole of the power source, and a plurality of sieve holes being provided in each of the pole plates. A middle part of the second treatment container is configured with a plurality of filler layers spaced apart in a vertical direction, and a bottom of the second treatment container is configured with an iron-carbon filler. An iron-carbon filler is provided at a bottom of the second treatment container, and a filler in the filler layers includes calcium peroxide and magnetite particles.

In some embodiments, for the two pole plates in each of the pole plate pairs, sieve holes of the pole plate above is larger than sieve holes of the pole plate below.

In some embodiments, each of the pole plate pairs is configured with a downcomer, an upper end of the downcomer facing upwardly beyond the pole plate above in the each of the pole plate pairs, and a lower end of the downcomer facing downwardly beyond the pole plate below in the each of the pole plate pairs.

In some embodiments, downcomers of the pole plate pairs are provided opposite to each other.

In some embodiments, at least one of the filler layers includes a net cover and a filler filled in the net cover.

In some embodiments, at least one of the filler layers is a filler drawer, the filler drawer being inserted in the second treatment container.

In some embodiments, the filler layers are provided at an incline, for each of the filler layers, an adjacent filler layer is inclined in an opposite direction.

In some embodiments, a lower end portion of the filler layers is provided with filler holes penetrating up and down.

In some embodiments, the iron-carbon filler includes a flat layer and a plurality of filler columns projecting upwardly from the flat layer, and a metal net is wrapped around an outer surface of the filler columns.

In some embodiments, at least one cleaning window is provided at an upper end portion of the second treatment container, or an outlet is provided at a lower end portion of the second treatment container.

BRIEF DESCRIPTION OF THE DRAWINGS

The present disclosure will be further illustrated by way of exemplary embodiments, which will be described in detail through the accompanying drawings. These embodiments are not limiting, and in these embodiments, the same numbering indicates the same structure, wherein.

DETAILED DESCRIPTION

Figure 1:
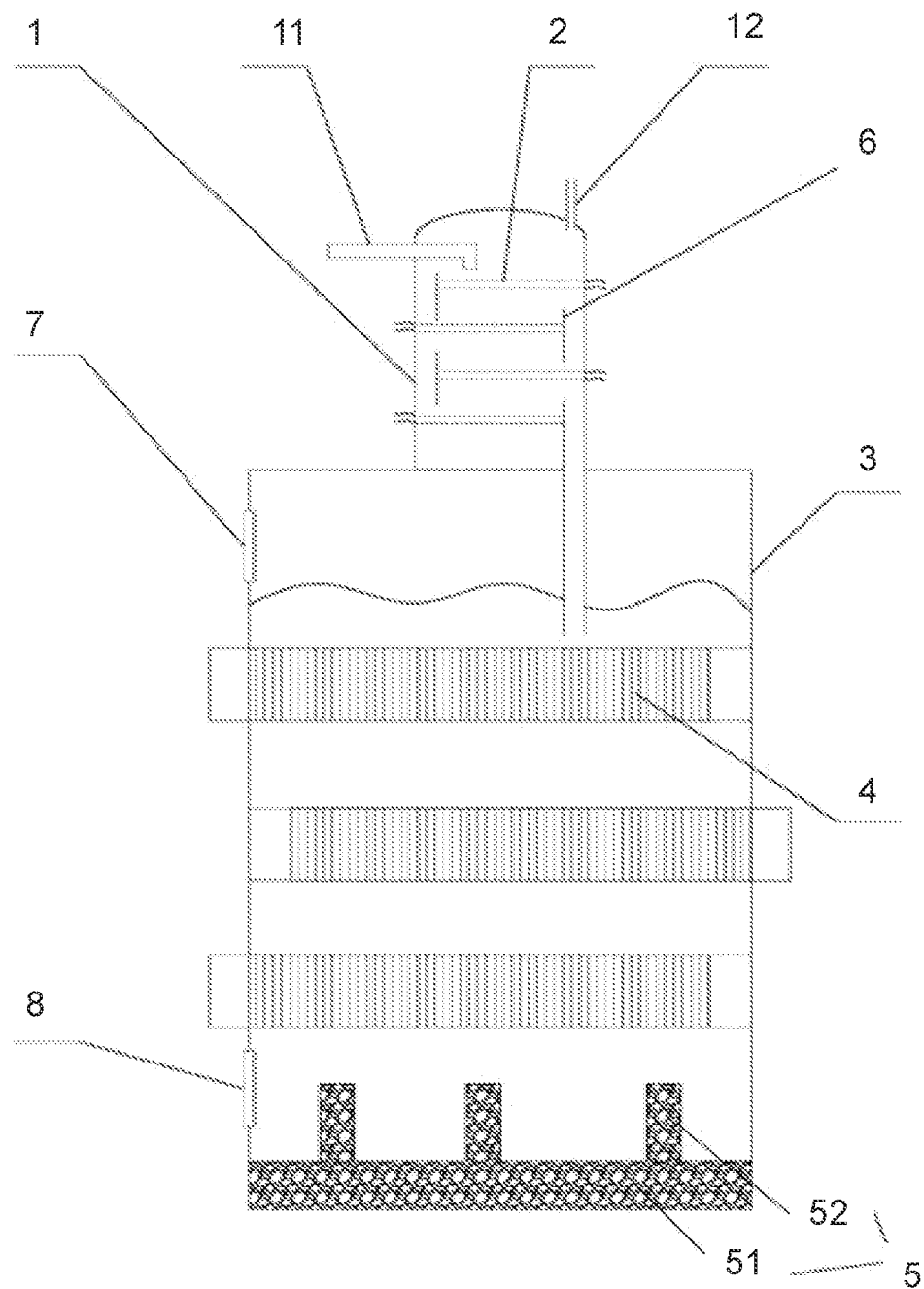
FIG. 1 is a diagram of an exemplary structure of a device for kitchen waste digestion according to some embodiments of the present disclosure.

In order to more clearly illustrate the technical solutions of the embodiments of the present disclosure, the accompanying drawings for the description of the embodiments will be described below. Obviously, the accompanying drawings in the following description are only some examples or embodiments of the present disclosure, and it is possible for a person of ordinary skill in the art to apply the present disclosure to other similar scenarios in accordance with these accompanying drawings without creative labor. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, parts, sections, or assemblies at different levels. However, if other words may achieve the same purpose, the terms may be replaced with alternative expressions. As shown in the present disclosure and claims, the words "one", "a", "a kind" and/or "the" are not especially singular but may include the plural unless the context expressly suggests otherwise.

FIG. 1 is a diagram of an exemplary structure of a device for kitchen waste digestion according to some embodiments of the present disclosure. Some of the following embodiments may be understood with reference to FIG. 1, but the accompanying drawings are only an illustration of some of these embodiments and do not constitute a limitation of the embodiments.

In some embodiments, as shown in FIG. 1, the device for kitchen waste digestion may include a first treatment container 1 and a second treatment container 3, a top of the second treatment container 3 connecting to a bottom of the first treatment container 1. In some embodiments, the first treatment container 1 is provided with a feed pipe 11 and an exhaust pipe 12 at a top, and internally configured with a plurality of pole plate pairs spaced apart from top to bottom. In some embodiments, the second treatment container 3 is configured with a plurality of filler layers 4 spaced apart in a vertical direction in a middle part of the second treatment container 3, and an iron-carbon filler 5 is provided at a bottom of the second treatment container.

The first treatment container 1 and the second treatment container 3 refer to containers for treating liquid waste.

The polar plate pair refers to an electrode pair capable of generating an electrolysis reaction. In some embodiments, the pole plate pairs include two pole plates 2 spaced apart from top to bottom, one of the pole plates 2 in the pole plate pairs being connected to a positive pole of a power source and another being connected to a negative pole of the power source. In some embodiments, a voltage connected to the pole plate pair may be 20 to 35 V.

The filler layers 4 refer to a part containing a filler that facilitates a digestion reaction. The filler in the filler layers 4 may include calcium peroxide and magnetite particles. In some embodiments, in the filler in the filler layers 4, the dosage ratio of calcium peroxide and magnetite particles is (3-4):1, and both the calcium peroxide and magnetite particles have a diameter of 1 to 3 cm.

In some embodiments, a plurality of sieve holes 21 may be provided on each pole plate 2. In some embodiments, for the two pole plates 2 in each of the pole plate pairs, sieve holes 21 of the pole plate 2 above is larger than sieve holes 21 of the pole plate 2 below. The structure, as described above, can increase a time that liquid waste stays on the pole plate 2 below, while the liquid waste stays on the lower pole plate 2 and is subjected to the electrolysis reaction during the stay. In some embodiments, in each of the pole plate pairs, diameters of the sieve holes of the pole plate 2 above are 1 to 2 cm, and diameters of the sieve holes of the pole plate 2 below are 0.3 to 0.5 cm.

Figure 2:
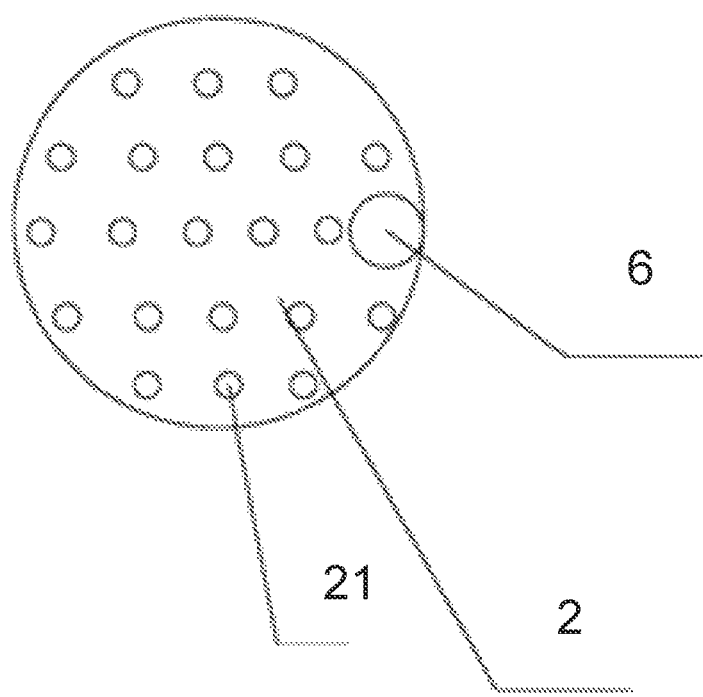
FIG. 2 is an exemplary structural view of a pole plate of a device for kitchen waste digestion according to some embodiments of the present disclosure.

FIG. 2 is an exemplary structural view of a pole plate of a device for kitchen waste digestion according to some embodiments of the present disclosure.

In some embodiments, as shown in FIGS. 1-2, each of pole plate pairs is configured with a downcomer 6. The downcomer 6 refers to a tube for a flow of liquid waste. An upper end of the downcomer 6 faces upwardly beyond the pole plate 2 above in the pole plate pairs, and a lower end faces downwardly beyond the pole plate 2 below in the pole plate pairs. In some embodiments, the upper end of the downcomer 6 is about 3 to 5 cm beyond the pole plate 2 above in the pole plate pairs, and the lower end of the downcomer 6 is about 2 to 3 cm beyond the pole plate 2 below in the pole plate pairs. In some embodiments, the downcomers of the pole plate pairs are provided opposite to each other at a relatively long distance from each other.

When an amount of liquid waste to be treated is large, resulting in a relatively fast feeding, the flow of the liquid waste through the sieve holes 21 of the pole plate 2 becomes insufficient, and an accumulation height exceeds a protrusion height of each layer's downcomer 6, the liquid waste may directly flow into a next layer through the downcomer 6 to be directly treated with the electrolysis reaction, and then overflow downwardly to continue to be digested with the help of the filler layers 4.

Figure 3:
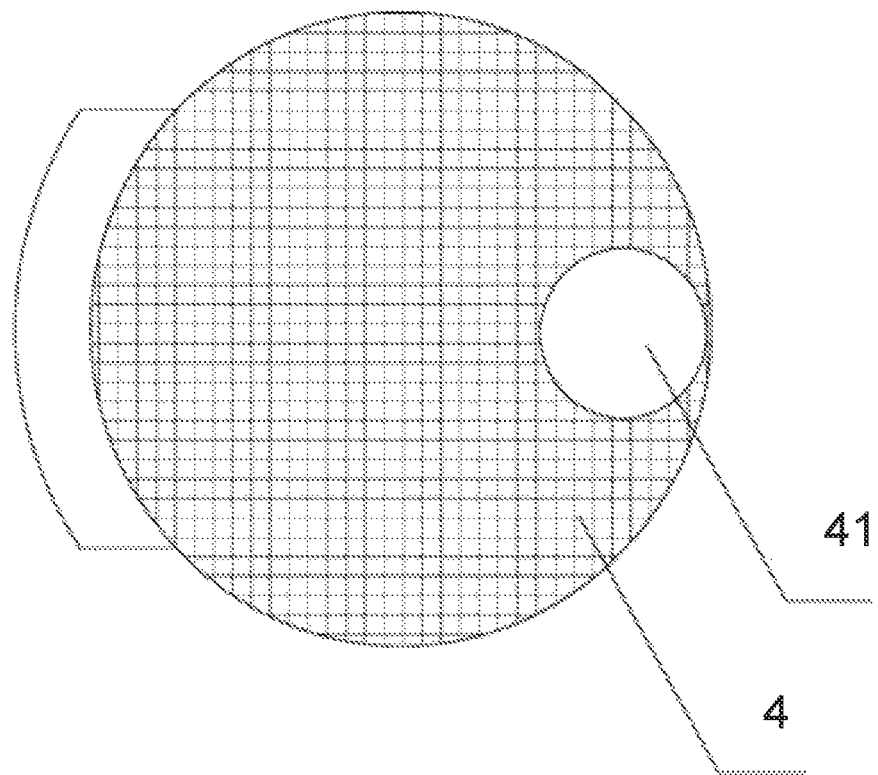
FIG. 3 is an exemplary structural view of a filler layer of a device for kitchen waste digestion according to some embodiments of the present disclosure.

FIG. 3 is an exemplary structural view of a filler layer of a device for kitchen waste digestion according to some embodiments of the present disclosure.

In some embodiments, at least one of the filler layers 4 includes a net cover and a filler filled in the net cover. In some embodiments, a filler hole 41 is provided on one side of the net cover as shown in FIG. 3. A shape of the net cover may be in the shape of a square cake or a round cake, and is not limited herein.

In some embodiments, the at least one of the filler layers 4 is a filler drawer, the filler drawer being inserted in the second treatment container 3. A provision of the filler drawer allows for easy updating and maintenance of the filler. In some embodiments, the net cover may be in the shape of the square cake or other shapes in order to facilitate the pushing and pulling of the filler drawer.

In some embodiments, the filler layers 4 are provided at an incline, for each of the filler layers, an adjacent filler layer 4 is inclined in an opposite direction. For example, the filler layer 4 is inclined at an angle of 5°. As another example, the filler layer 4 is inclined at an angle of 3°. As yet another example, the filler layer 4 is inclined at an angle of 8°. An inclined setting of the filler layers 4 can extend a time that the liquid waste passes through the filler layers 4, thereby enhancing hydrolysis and acidification efficiency of the liquid waste.

In some embodiments, a lower end portion of the filler layer 4 is provided with the filler hole 41 penetrating up and down. Large particles in the kitchen waste may fall into a next layer through the filler hole 41, thereby preventing large particles in the kitchen waste to accumulate in the filler layers 4.

In some embodiments, as shown in FIG. 1, the iron-carbon filler 5 includes a flat layer 51 and a plurality of filler columns 52 projecting upwardly from the flat layer 51, and a metal net is wrapped around an outer surface of the filler columns 52. The iron-carbon filler 5 is provided according to the above description so that a surface area of the iron-carbon filler 5 participating in the electrolysis reaction can be increased, such that the iron-carbon filler 5 can be in full contact with the kitchen waste to improve the electrolytic decomposition efficiency.

In some embodiments, as shown in FIG. 1, at least one cleaning window 7 is provided at an upper end portion of the second treatment container 3 to facilitate an operator to clean an interior of the second treatment container 3 through the at least one cleaning window 7.

In some embodiments, as shown in FIG. 1, an outlet 8 is provided at a lower end portion of the second treatment container 3 to facilitate discharging through the outlet 8 after digestion is completed.

The device for kitchen waste digestion shown in some embodiments of the present disclosure operates as follows:

removing solids precipitated in pulverized kitchen waste to obtain liquid waste; feeding the liquid waste into the first treatment container 1 from the feeding pipe 11, and subjecting the liquid waste to an electrolysis reaction between the two pole plates 2 in pole plate pairs in a process of dropping down; converting, through a process of electrolysis, chlorine ions in the liquid waste into a chlorine gas, which flows upwardly and is pumped out; and the liquid waste flowing into the second treatment container 3 after a plurality of layers of electrolysis, gradually penetrating into the filler layers 4, and contacting with calcium peroxide and magnetite particles in the filler layers 4. The calcium peroxide creates a micro-oxygen environment for the liquid waste and stimulates a growth of parthenogenetic bacteria in the liquid waste. The parthenogenetic bacteria are mainly involved in glycolysis, amino acid metabolism, tricarboxylic acid cycle, fatty acid metabolism, pyruvic acid metabolism, and other pathways, thereby enhancing the efficiency of hydrolysis and acidification of a substrate, releasing more small molecule intermediates, which are utilized by methanogenic archaea in the liquid waste. The magnetite particles allow the methanogenic archaea to reduce energy consumption for electron transfer with fermenting bacteria, ensuring a higher level of energy metabolism. The calcium peroxide and the magnetite particles achieve increased anaerobic digestion efficacy by improving a metabolic balance between the fermenting bacteria and the methanogenic archaea, thereby accelerating a conversion of organic matter to methane. The parthenogenic bacteria and the methanogenic archaea may be naturally carried in the kitchen waste.

When one-third of a volume of the second treatment container 3 is fed, the feeding process pauses briefly. The liquid waste inside the second treatment container 3 undergoes fermentation for 2 to 3 days, and the feeding process continues after the methane is generated. At this point, as the methane is generated a bottom of the second treatment container 3 and escapes, the escaped methane has a stripping effect on the chlorine gas generated during the electrolysis process on the surfaces of the pole plates 2, reducing a dissolved amount of chlorine gas in the liquid waste. With a removal of the chlorine ions, microorganisms may better thrive and grow inside the second treatment container 3. Combined with effects of the calcium peroxide and the magnetite particles, an amount of the methane generated can be greatly increased.

The iron-carbon filler at the bottom of the second treatment container 3 may electrolytically decompose precipitated coarse particles, converting large molecules into small molecules to reduce an amount of coarse particles.

Some embodiments of the present disclosure provide a device for kitchen waste digestion that both remove the chloride ions and promote methane generation. An adoption of the calcium peroxide and the magnetite particles achieves an increase in anaerobic digestion efficacy by improving the metabolic balance between the fermenting bacteria and the methanogenic archaea. In addition, the methane generated in the second treatment container may be used for striping the chlorine gas, reducing the dissolved amount of the chlorine gas. At the same time, the removal of the chlorine ions allows the microorganisms to better grow in the second treatment container.

In some embodiments, the device for kitchen waste digestion further includes a first adjustment device and a second adjustment device. The first adjustment device is configured to adjust diameters of the sieve holes 21 of each pole plate 2 in the pole plate pairs. The first adjustment device may be of any feasible structure, for example, the first adjustment device may be a device capable of adjusting a relative position of two pole plates 2 overlapping each other, such that the diameters of the sieve holes 21 are maximized when the two pole plates 2 overlap each other up and down in a same position, and the diameters of the sieve holes 21 are reduced when the sieve holes 21 of the two pole plates are staggered by a certain value. It is to be noted that the diameters of the sieve holes 21 may be adjusted not only qualitatively, but also quantitatively. The diameters of the sieve holes 21 are factory-set by the device, and the diameters of the sieve holes 21 may be accurately adjusted by the first adjustment device to increase or decrease a specified size. The second adjustment device is configured to adjust an inclination angle of the filler layers 4. The second adjustment device may be of any feasible structure, for example, the second adjustment device may be a driving device provided on downwardly inclined sides of the filler layers 4. Exemplarily, the second adjustment device may be a cylinder, the cylinder controlling upward and downward movements of one side of the filler layers 4, thereby controlling the inclination angle of the filler layers 4.

In some embodiments, the device for kitchen waste digestion further includes a chlorine gas monitoring device and a processor. The chlorine gas monitoring device is configured to detect a chlorine gas content, and the chlorine gas content per unit volume is a chlorine gas concentration. The chlorine gas monitoring device includes a gas sensor configured to detect the chlorine gas, a chlorine gas detector, etc. In some embodiments, the chlorine gas monitoring device may be deployed in the first treatment container 1 to detect the chlorine gas content in the first treatment container 1. The processor is configured to process at least one of data or information obtained from other devices or system components. The processor may execute a program instruction based on at least one of the data, the information, or a processing result to realize one or more functions described in the present disclosure. In some embodiments, the processor is communicatively connected to the first adjustment device, the second adjustment device, and the chlorine gas monitoring device, respectively.

In some embodiments, the processor may determine a first treatment time based on a composition of the liquid waste. The composition of the liquid waste may be obtained by sampling and testing the liquid waste prior to treatment of the liquid waste. The first treatment time includes a time when the liquid waste is subjected to the electrolysis reaction in the first treatment container 1. In some embodiments, the first treatment time may be determined by consulting a preset table based on, for example, a type of the liquid waste and a magnitude of electrolysis current.

In some embodiments, the processor may determine preferred diameters of the sieve holes 21 of the each pole plate 2 in one or more pole plate pairs based on the first treatment time, and control the first adjustment device to adjust the diameters.

In some embodiments, the processor may determine a liquid waste flow rate based on the first treatment time, and determine, based on the liquid waste flow rate, the preferred diameters through a diameter determination algorithm. In some embodiments, the processor may obtain the liquid waste flow rate by calculation based on the first treatment time and an amount of the liquid waste. The amount of the liquid waste refers to an amount of a current batch of liquid waste in the device, in terms of mass or volume, as detected by a mass-detecting instrument or a volume-detecting instrument. In some embodiments, the diameter determination algorithm may be as follows: a function is established by data fitting based on a relationship between the composition of the liquid waste, the liquid waste flow rate, and the diameters of the sieve holes of the polar plates.

In some embodiments, the processor may obtain a chlorine gas concentration sequence from the chlorine gas monitoring device and determine a second treatment time based on the chlorine gas concentration sequence and the composition of the liquid waste. The second treatment time includes a time for the liquid waste to pass through the filler layers 4.

In some embodiments, the processor may determine the second treatment time based on a second treatment time prediction model. In some embodiments, the second treatment time prediction model is a machine learning model. An input of the second treatment time prediction model may include the chlorine gas concentration sequence, a current liquid oxygen content, a current temperature of the second treatment container 3, and the composition of the liquid waste, and an output is a predicted second treatment time. The chlorine gas concentration sequence is a time-based sequence of chlorine gas concentration changes. The current liquid oxygen content refers to a current oxygen content in the liquid waste, which may be obtained by an oxygen content sensor. The current temperature of the second treatment container 3 may be obtained by a temperature monitoring device. For more on the oxygen content sensor, see the description below.

The second treatment time prediction model may be obtained by training based on a large number of training samples with labels. In some embodiments, the training samples may include at least a sample chlorine gas concentration sequence, a sample liquid oxygen content, a temperature of a sample second treatment container 3, and a sample composition of liquid waste. The labels may include a corresponding optimal second treatment time under a sample condition. In some embodiments, a plurality of candidate second treatment times may be set for experimentation under the sample condition, and a candidate second treatment time that results in a subsequent methane output rate greater than a preset output threshold may be selected as the label corresponding to the sample conditions.

In some embodiments, the second treatment time prediction model may be trained and a model parameter updated in various ways based on the above samples. For example, the second treatment time prediction model may be trained based on a gradient descent manner. In some embodiments, the training ends when a trained second treatment time prediction model satisfies a preset condition. The preset condition may be that a loss function result converges or is less than a preset threshold, etc.

In some embodiments, the processor may determine, based on the second treatment time, a preferred inclination angle of the one or more filler layers 4 and control the second adjustment device to adjust the preferred inclination angle. In some embodiments, the processor may determine the preferred inclination angle of the one or more filler layers 4 by looking up a table based on the second treatment time and the composition of the liquid waste. In some embodiments, further consideration may be given to viscosity of the liquid waste, when the viscosity of the liquid waste is different, a required inclination angle of the filler layers 4 is different for a same second treatment time, and thus based on the preferred inclination angle obtained as previously described and the viscosity of the liquid waste, a final preferred inclination angle may be further determined. For example, if the viscosity of the liquid waste exceeds a preset viscosity threshold, the inclination angle of the filler layers 4 is increased by 0.5°.

In some embodiments, the device for kitchen waste digestion further includes the temperature monitoring device and a suction device. The temperature monitoring device may be deployed in the first treatment container 1 and the second treatment container 3 for temperature monitoring. The suction device may be deployed in the first treatment container 1 for gas extraction. In some embodiments, the processor may determine a suction power of the suction device based on a chlorine gas generation rate, a current chlorine gas content, and a current temperature of the first treatment container 1, and the suction device extracts the chlorine gas from the first treatment container 1 at the suction power. The chlorine gas generation rate refers to a rate of chlorine gas generation in the first treatment container 1, i.e., a chlorine gas content increased in the first treatment container 1 per unit time. The chlorine gas generation rate and the current chlorine gas content may be obtained by the chlorine gas monitoring device provided in the first treatment container 1. The current temperature of the first treatment container 1 is obtained by the temperature monitoring device. In some embodiments, the suction power of the suction device may be determined by a vector database. For example, the processor may construct a suction vector based on the chlorine gas generation rate, the current chlorine gas content, and the current temperature of the first treatment container 1, match a standard vector with a highest similarity in the vector database to a suction vector and take a standard suction power corresponding to the standard vector as the suction power of the suction device.

By adjusting the suction power, the processor may control the power reasonably to avoid excessive suction power that leads to energy waste or insufficient suction power that results in high chlorine gas content in the liquid waste.

In some embodiments, a plurality of chlorine gas monitoring devices may be distributed at a plurality of different heights, respectively. In some embodiments, the processor may individually adjust the diameters of the sieve holes of one or more polar plates based on chlorine gas concentrations at the plurality of different heights, wherein some heights in the plurality of different heights may be the same or different from heights of the pole plates.

Exemplarily, if the chlorine gas concentration monitored by the chlorine gas monitoring device at a current pole plate is close to 0, it indicates that the elemental chlorine has essentially been electrolyzed by the time the liquid waste is located at the current pole plate, and at this time, it is necessary to increase the diameters of the sieve holes of the current pole plate and the pole plate below the current pole plate to accelerate the flow of the liquid waste.

In some embodiments, the device for kitchen waste digestion further includes an oxygen content sensor. The oxygen content sensor may be configured to monitor an oxygen content in liquid at a location where the filler layer 4 is located. The oxygen content sensor may be a dissolved oxygen sensor.

In some embodiments, the processor may determine whether to replace the filler layer 4 based on an oxygen content change. The oxygen content change may indicate a difference between oxygen contents of the liquid measured by the oxygen content sensor at at least at two time points, and a greater oxygen content change may reflect that the filler layers 4 are consumed more.

In some embodiments, the filler layers 4 need to be replaced when the oxygen content of the liquid at a time point is less than an oxygen content threshold, or when the oxygen content of the liquid at the time point decreases relative to the oxygen content of the liquid at a previous time point and a decrease rate is greater than a decrease threshold. In some embodiments, the processor may issue an early warning based on a need to replace the filler layers 4. The early warning may be an alert to an operator via an audible or textual display, and the operator may manually replace the filler layers 4 after being informed of the early warning. In some embodiments, the processor may also automatically replace a filler by controlling a filler drawer to be withdrawn. The filler of the filler layers 4 can create a micro-oxygen environment for bacteria and promote the conversion of organic matter to methane. By providing an oxygen content sensor to monitor the oxygen content change and replacing the filler layers 4 in a timely manner, the efficiency of a liquid waste digestion reaction can be improved.

In some embodiments, the processor may predict a replacement time for the filler layer 4 based on the composition of the liquid waste and the second treatment time, so that the filler layer 4 can be replaced in advance and accurately, improving efficiency. In some embodiments, the replacement time may be calculated as follows: replacement time=standard replacement time−elapsed time−coefficient 1*first compensation time−coefficient 2*second compensation time. The standard time, the first compensation time, and the second compensation time may be preset or determined based on an experiment. For example, the standard time may be an average time for replacing the filler layer 4 during the experiment. The coefficient 1 is related to the composition of the liquid waste. For example, the more components of the liquid waste that need to be treated, the more consumption of the filler, and the larger the coefficient 1. The coefficient 2 is related to the second treatment time. For example, the longer the second treatment time, the larger the coefficient 2.

In some embodiments, the device for kitchen waste digestion further includes a methane monitoring device. The methane monitoring device is deployed in the second treatment container 3 to monitor a methane content generated in the second treatment container 3. The methane monitoring device may be a gas composition analyzer, etc.

In some embodiments, the processor may determine a feeding regimen based on the methane content generated in the second treatment container 3 and control the feeding of the liquid waste to the device from the feeding tube 11 based on the feeding regimen. A feeding regimen refers to a regimen for feeding the liquid waste. The feeding regimen includes a feeding time point and a feeding amount. The feeding amount refers to an amount of a next batch of liquid waste that is about to be fed into the device, which may be measured by mass or volume.

In some embodiments, the processor may generate a plurality of candidate feeding regimens and determine the feeding regimen based on the plurality of the candidate feeding regimen through a feeding regimen model. In some embodiments, the processor may randomly generate the plurality of the candidate feeding regimens. In some embodiments, the processor may also generate the plurality of the candidate feeding regimens based on a randomized adjustment of a feeding average of historical data.

In some embodiments, the feeding regimen model is a machine learning model. The feeding regimen model includes a feeding time prediction layer and a regimen determination layer. In some embodiments, the feeding time prediction layer may be a Long Short-Term Memory (LSTM) model and the regimen determination layer may be a Neural Network (NN) model.

An input of the feeding time prediction layer may include a current temperature, a methane output rate, a current methane content, and a liquid waste volume of the second treatment container 3, and an output is a predicted feeding time point. An input of the regimen determination layer may include the predicted feeding time point and a candidate feeding regimen, and an output is a predicted methane output rate. The current temperature of the second treatment container 3 may be obtained by the temperature monitoring device provided in the second treatment container 3. The methane output rate refers to a methane generation rate in the second treatment container 3, i.e., a methane content increased in the second treatment container 3 per unit time. The current methane content and the methane output rate may be obtained by the methane monitoring device provided in the second treatment container 3.

In some embodiments, training samples for the feeding regimen model may include a sample feeding time point and a sample candidate feeding regimen. A label may include an actual methane output rate corresponding to a sample condition.

In some embodiments, the processor may determine a candidate feeding regimen corresponding to a predicted methane output rate greater than an output threshold or a largest predicted methane output rate as the feeding regimen.

In some embodiments, the device for kitchen waste digestion further includes a pH control device and a temperature control device. The pH control device is configured to monitor and adjust a pH of the liquid waste. For example, the pH control device may include an alkaline addition device to adjust the pH by adding an alkaline substance. The temperature control device is configured to adjust a temperature. For example, the temperature control device is a heater with adjustable power. The pH control device and the temperature control device may be deployed in the second treatment container 3.

In some embodiments, the processor may determine an optimal pH and an optimal temperature based on the composition of the liquid waste, and control an operation of the pH control device and the temperature control device based on the optimal pH and the optimal temperature.

In some embodiments, the processor may determine the optimal pH value and the optimal temperature suitable for bacterial survival and production by consulting a table based on different types of bacteria corresponding to different compositions of the liquid waste. For example, methanogenic archaea will be stopped metabolizing at pH<6.7, and the optimal pH should be controlled at no less than 6.7. As another example, ranges of the optimal temperature for methanogenic archaea are 30° C.-35° C. and 50° C.-65° C., respectively. By providing the pH control device and the temperature control device to maintain the pH and the temperature in the second treatment container 3 in an optimal state, it promotes bacterial survival and production, thereby improving the efficiency of the conversion of organic matter to methane in the liquid waste.

The basic concepts have been described above, and it is apparent that to a person skilled in the art, the above detailed disclosure is intended as an example only and does not constitute a limitation of the present disclosure. Although not expressly stated herein, various modifications, improvements, and amendments may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment", "one embodiment", and/or "some embodiments" are meant to refer to a certain feature, structure, or characteristic associated with at least one embodiment of the present disclosure. Accordingly, it should be emphasized and noted that "an embodiment" or "one embodiment" or "an alternative embodiment" mentioned two or more times in different places in the present disclosure do not necessarily refer to the same embodiment. Furthermore, certain features, structures, or characteristics in one or more embodiments of the present disclosure may be suitably combined.

Furthermore, unless expressly stated in the claims, the order of processing elements and sequences, the use of numerical letters, or the use of other names described herein are not intended to limit the order of the processes and methods of the present disclosure. Although a number of embodiments of the present disclosure currently considered useful are discussed in the above disclosure by way of various examples, it should be understood that such details serve illustrative purposes only, and that additional claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the present disclosure, and thus aid in the understanding of one or more embodiments of the present disclosure, the preceding description of embodiments of the present disclosure sometimes combines multiple features into a single embodiment, accompanying drawings, or description thereof. However, this way of disclosure does not imply that the subject matter of the present disclosure requires more features than those mentioned in the claims. Rather, claimed subject matter may lie in less than all features of a single foregoing disclosed embodiment.

In some embodiments, numeric values describing the composition and quantity of attributes are used in the description. It should be understood that such numeric values used for describing embodiments may be modified with qualifying terms such as "about", "approximately", or "generally". Unless otherwise stated, "about", "approximately", or "generally" indicates that a variation of ±20% is permitted in the described numbers. Accordingly, in some embodiments, the numerical parameters used in the disclosure and claims are approximations, which can change depending on the desired characteristics of the individual embodiment. In some embodiments, the numerical parameters should take into account a specified number of valid digits and employ a general manner of bit retention. Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents and the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

Finally, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. A device for kitchen waste digestion, comprising:
   a first treatment container, provided with a feed pipe and an exhaust pipe at a top, and internally configured with a plurality of pole plate pairs spaced apart from top to bottom, each of the pole plate pairs including a pole plate above and a pole plate below spaced apart from top to bottom, one of the pole plate above and the pole plate below in each of the pole plate pairs being connected to a positive pole of a power source and another being connected to a negative pole of the power source, and a plurality of sieve holes being provided in each of the pole plate above and the pole plate below; and
   a second treatment container, a top of the second treatment container connecting to a bottom of the first treatment container, a middle part of the second treatment container being configured with a plurality of filler layers spaced apart in a vertical direction, and a bottom of the second treatment container being configured with an iron-carbon filler; and a filler in the filler layers including calcium peroxide and magnetite particles.

2. The device according to claim 1, wherein, a size of sieve holes of the pole plate above is larger than a size of sieve holes of the pole plate below.

3. The device according to claim 1, wherein each of the pole plate pairs is configured with a downcomer, an upper end of the downcomer facing upwardly beyond the pole plate above in the each of the pole plate pairs, and a lower end of the downcomer facing downwardly beyond the pole plate below in the each of the pole plate pairs.

4. The device according to claim 3, wherein downcomers of the pole plate pairs are provided opposite to each other.

5. The device according to claim 1, wherein at least one of the filler layers includes a net cover and a filler filled in the net cover.

6. The device according to claim 1, wherein at least one of the filler layers is a filler drawer, the filler drawer being inserted in the second treatment container.

7. The device according to claim 1, wherein the filler layers are provided at an incline, for each of the filler layers, an adjacent filler layer is inclined in an opposite direction.

8. The device according to claim 7, wherein a lower end portion of the filler layers is provided with filler holes penetrating up and down.

9. The device according to claim 1, wherein the iron-carbon filler includes a flat layer and a plurality of filler columns projecting upwardly from the flat layer, and a metal net is wrapped around an outer surface of the filler columns.

10. The device according to claim 1, wherein at least one cleaning window is provided at an upper end portion of the second treatment container; or an outlet is provided at a lower end portion of the second treatment container.

* * * * *